(12) United States Patent
Freijy et al.

(10) Patent No.: US 6,676,216 B1
(45) Date of Patent: Jan. 13, 2004

(54) VEHICLE SEAT ASSEMBLY

(75) Inventors: Nizar Freijy, Lake Orion, MI (US); Robert John Dowell, Rochester, MI (US); Paul Cameron Babcock, Bloomfield Hills, MI (US); Dennis John Varga, Waterford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/105,048

(22) Filed: Mar. 22, 2002

(51) Int. Cl.[7] .................................................. B60N 2/02
(52) U.S. Cl. ....................... 297/335; 297/353; 296/65.09
(58) Field of Search ................................. 297/331, 332, 297/333, 334, 335, 336, 353; 296/65.05, 65.09, 65.16

(56) References Cited

U.S. PATENT DOCUMENTS

| | | | | |
|---|---|---|---|---|
| 3,011,581 A | * | 12/1961 | Wood | 180/89.18 |
| 3,054,641 A | | 9/1962 | Smith | |
| 4,194,782 A | * | 3/1980 | Itoh | 296/190.11 |
| 4,609,221 A | | 9/1986 | Böttcher | |
| 4,736,985 A | * | 4/1988 | Fourrey et al. | 297/331 |
| 4,793,649 A | | 12/1988 | Yamano et al. | |
| 4,884,843 A | * | 12/1989 | DeRees | 297/331 |
| 4,925,228 A | * | 5/1990 | Pipon et al. | 296/65.06 |
| 5,224,750 A | * | 7/1993 | Clark et al. | 296/65.06 |
| 5,474,353 A | | 12/1995 | Koester et al. | |
| 5,482,349 A | | 1/1996 | Richter et al. | |
| 5,707,103 A | | 1/1998 | Balk | |
| 5,934,732 A | * | 8/1999 | Jakubiec | 296/65.01 |
| 5,951,084 A | | 9/1999 | Okazaki et al. | |
| 5,951,104 A | * | 9/1999 | Tsuchiya et al. | 297/316 |
| 6,000,742 A | * | 12/1999 | Schaefer et al. | 296/65.09 |
| 6,135,555 A | | 10/2000 | Liu et al. | |
| 6,199,931 B1 | | 3/2001 | Shaw | |
| 6,224,132 B1 | | 5/2001 | Neale | |
| 6,244,645 B1 | | 6/2001 | Baumert et al. | |
| 6,382,491 B1 | * | 5/2002 | Hauser et al. | 296/65.05 |
| 2001/0050502 A1 | * | 12/2001 | Fourrey et al. | 297/331 |
| 2002/0130542 A1 | * | 9/2002 | Ellerich et al. | 296/64 |

FOREIGN PATENT DOCUMENTS

| | | | | |
|---|---|---|---|---|
| DE | 4134053 A1 | * | 4/1993 | B60N/2/30 |
| DE | WO 01/19640 A2 | * | 3/2001 | B60N/2/02 |
| JP | 56090734 A | * | 7/1981 | B60N/1/10 |
| JP | 56090735 A | * | 7/1981 | B60N/1/10 |
| JP | 63219432 A | * | 9/1988 | B60N/1/10 |

* cited by examiner

Primary Examiner—Peter M. Cuomo
Assistant Examiner—Stephen D'Adamo
(74) Attorney, Agent, or Firm—Bill C. Panagos

(57) ABSTRACT

A seat assembly for a vehicle includes a seat bottom and seat back which are movable to provide access to a third row seat. The seat bottom is movable between a seating position, wherein the seat bottom is in a generally horizontal position for supporting an occupant seated on the seat assembly, and a forward position. In the forward position, the seat bottom is in a generally vertical position such that a rear edge of the seat bottom is positioned above a front edge of the seat bottom. The seat assembly also includes a seat back movable between a seating position, wherein the seat back is in a generally vertical position for supporting an occupant seated on the seat assembly, and a second position. In the second position, the seat back is positioned upwardly and forwardly relative to the seating position of the seat back.

15 Claims, 9 Drawing Sheets

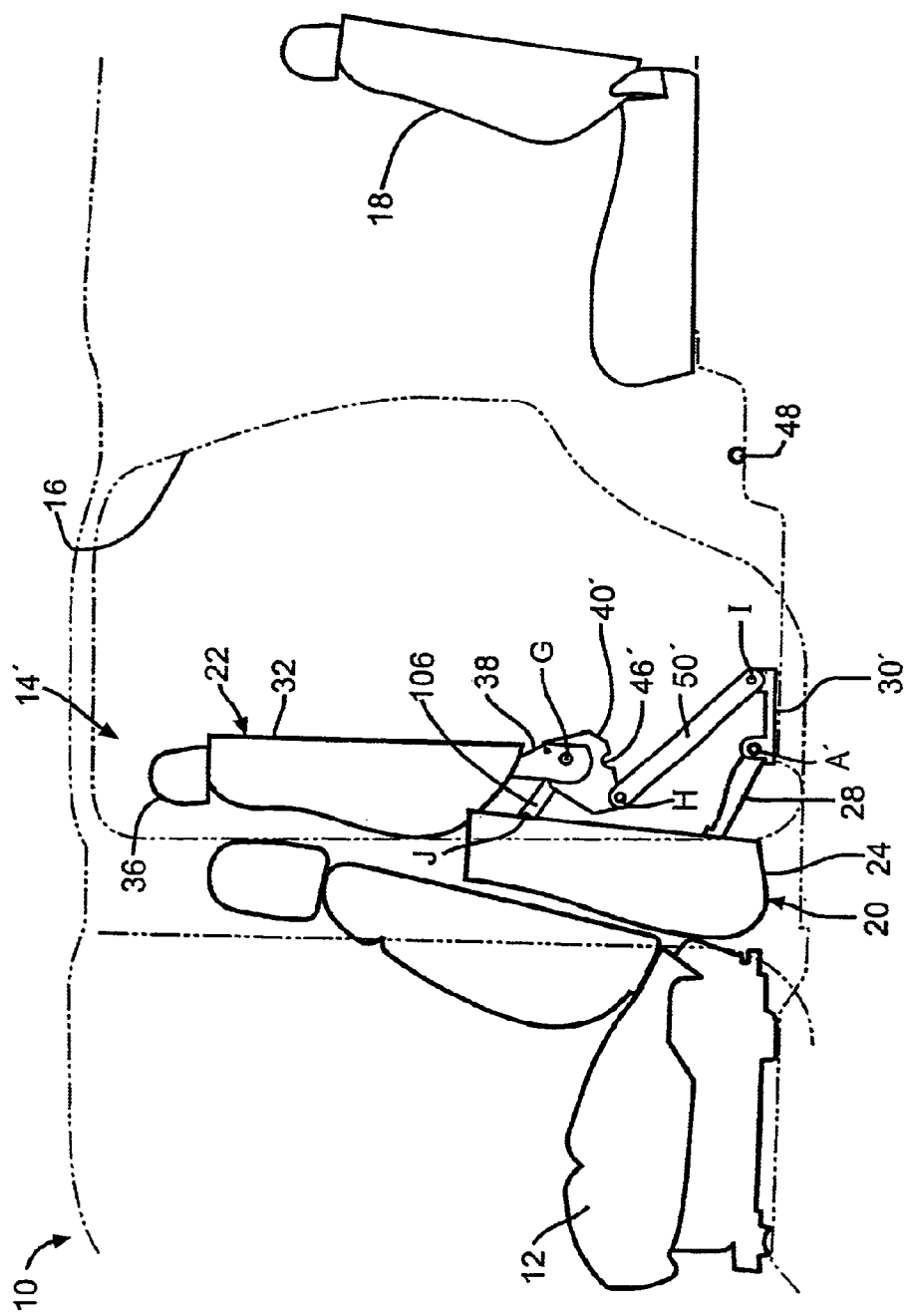

VEHICLE SEAT ASSEMBLY

BACKGROUND OF THE INVENTION

The present invention relates to a moveable seat assembly for a vehicle and more particularly to a moveable seat assembly which can be moved to allow easy entry to a third row seat or a cargo storage area.

It is becoming increasingly more common in passenger vehicles, such as sport utility vehicles and mini-vans, to include a third row seat or seats. Commonly, the vehicle includes a pair of front doors and a pair of rear doors located adjacent the front and second row of seats, respectively. The third row seat typically is a single bench seat extending across the width of the vehicle. The third row seat is commonly located at the generally furthermost rear portion of the vehicle and is not located adjacent a door opening. Thus, passengers do not have direct access to the third row seat.

To provide access to the third row seat or a rear storage area, it is known to have one or more of the second row seat assemblies movable to a forwardly folded position adjacent the front row of seats, such as disclosed in U.S. Pat. No. 6,135,555. The second row seat assembly is folded such that the seat back is first folded downwardly on top of the seat bottom, and then both are pivoted about a pivot point at a lower front edge of the seat bottom to approximately 90 degrees. The seat back of the second row seat assembly will then be positioned between the seat bottom and the seat back of the front row seat. The passenger can then enter the vehicle via one of the rear doors, and slip past the folded second row seat assembly, thereby permitting access to the third row seat. However, movement of such a second row seat is often difficult and cumbersome. Additionally, the area of ingress and egress through the rear door opening is often uncomfortably small for a typical vehicle occupant to transit because of the positioning of the folded second row seat assembly.

SUMMARY OF THE INVENTION

The invention relates to a moveable seat assemble which can be moved to allow easy entry to a third row seat or a cargo storage area. The seat assembly includes a seat bottom. The seat bottom is movable between a seating position, wherein the seat bottom is in a generally horizontal position for supporting an occupant seated on the seat assembly, and a forward position. In the forward position, the seat bottom is in a generally vertical position such that a rear edge of the seat bottom is positioned above a front edge of the seat bottom. The seat assembly also includes a seat back movable between a seating position, wherein the seat back is in a generally vertical position for supporting an occupant seated on the seat assembly, and a second position. In the second position, the seat back is positioned upwardly and forwardly relative to the seating position of the seat back.

Various objects and advantages of this invention will become apparent to those skilled in the art from the following detailed description of the preferred embodiment, when read in light of the accompanying drawings.

BRIEF DESCRIPTION OF THE DRAWINGS

FIG. 9 is a side elevational view of the seat assembly of FIG. 7 shown in an easy entry position.

DETAILED DESCRIPTION OF THE INVENTION

Figure 2:
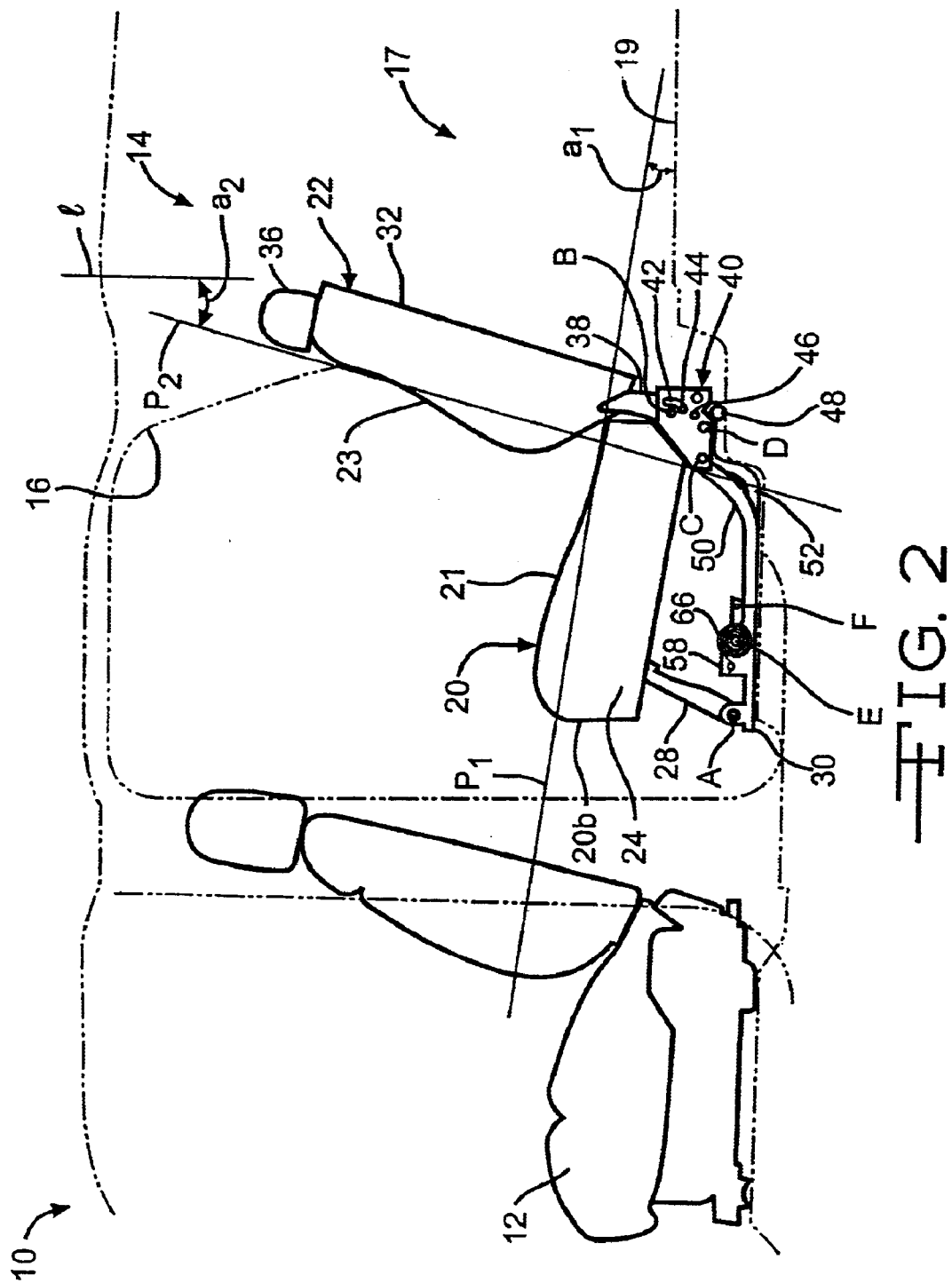
FIG. 2 is a side elevational view of the seat assembly of FIG. 1 shown in a seating position and installed in a motor vehicle.
Figure 4:
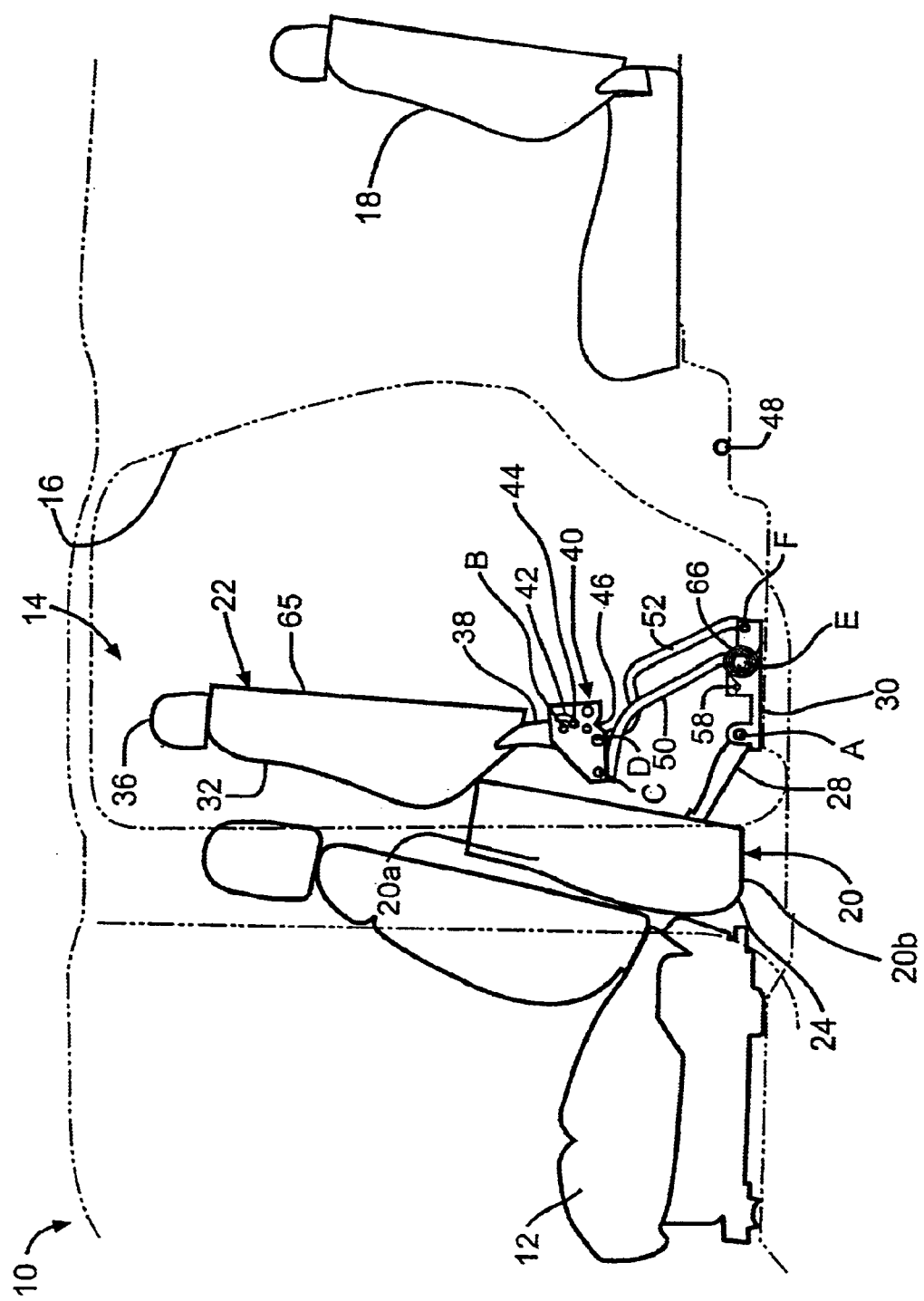
FIG. 4 is a side elevational view of the seat assembly of FIG. 1 installed in a motor vehicle having a third row seat, showing the seat assembly in an easy entry position.

Referring now to the drawings, FIGS. 2 and 4 show a portion of a passenger type motor vehicle, illustrated by phantom lines 10. The vehicle 10 preferably includes a front seat 12, a second row seat assembly 14, and a second row door opening 16. Typically, the seat assembly 14 is installed in a rear seating area of the vehicle so as to be located forward of a cargo area 17 (FIG. 2), or forward of a third row seat assembly 18 (FIG. 4). The cargo area 17 includes a relatively flat load floor 19.

As shown in FIGS. 1 through 5, the seat assembly 14 includes a seat bottom 20 and a seat back 22. It should be understood that when referring to the orientation or position of the seat bottom 20 and seat back 22 as used herein, the terms "horizontal" and "vertical" are general terms used to approximate their orientation relative to the horizon or floor of the vehicle 10. More particularly, the terms "horizontal" and "vertical" are used to approximate a plane defined by the seating surfaces 21 and 23 of the seat bottom 20 and seat back 22, respectively. Although the seating surfaces 21 and 23 can have any suitable contoured shape for comfort of the seat occupant, a plane can be approximated, as shown in FIG. 2, representing a relative flat surface.

As shown in FIG. 2, the seating surface 21 of the seat bottom 20 defines a plane $p_1$ which is approximately or generally in a horizontal position. Of course, the plane $p_1$ can be skewed or offset from the floor of the vehicle 10 by any suitable angle $a_1$, such as within a range of from about 0 to about 30 degrees. Similarly, the seating surface 23 of the seat back 22 defines a plane $p_2$ which is approximately or generally in a vertical position. Naturally, the plane $p_2$ is skewed or offset to accommodate the comfort and support of the back of the seat occupant. Thus, the plane $p_2$ can be skewed or offset from a line generally perpendicular to the floor of the vehicle 10, by any suitable angle $a_2$, such as within a range of from about 5 to about 45 degrees. It should also be understood that either one or both of the seat bottom 20 and the seat back 22 may, at various times, be in either the horizontal position or the vertical position, as herein described.

Figure 1:
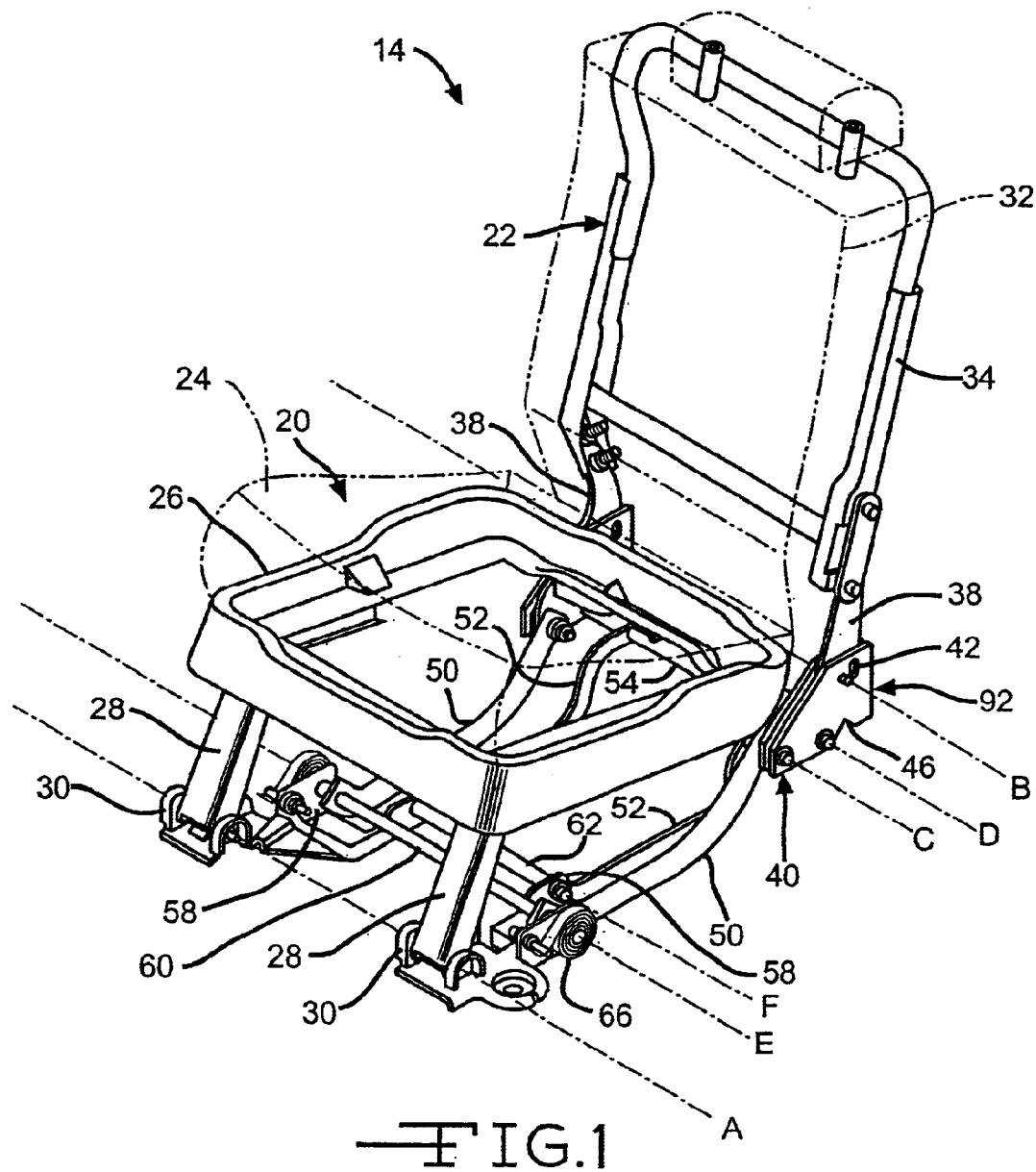
FIG. 1 is a perspective view of a portion of a first embodiment of a seat assembly in accordance with the present invention.

As best shown in FIG. 1, the seat bottom 20 includes seat bottom cushion, indicated by phantom lines 24, suitably attached to a seat bottom frame 26. Preferably, two legs 28 extend downwardly from the seat bottom frame 26 and are attached thereto by any suitable means, such as welding or by threaded fasteners. Although two legs 28 are illustrated, it will be appreciated that any number of legs may be used.

Figure 3:
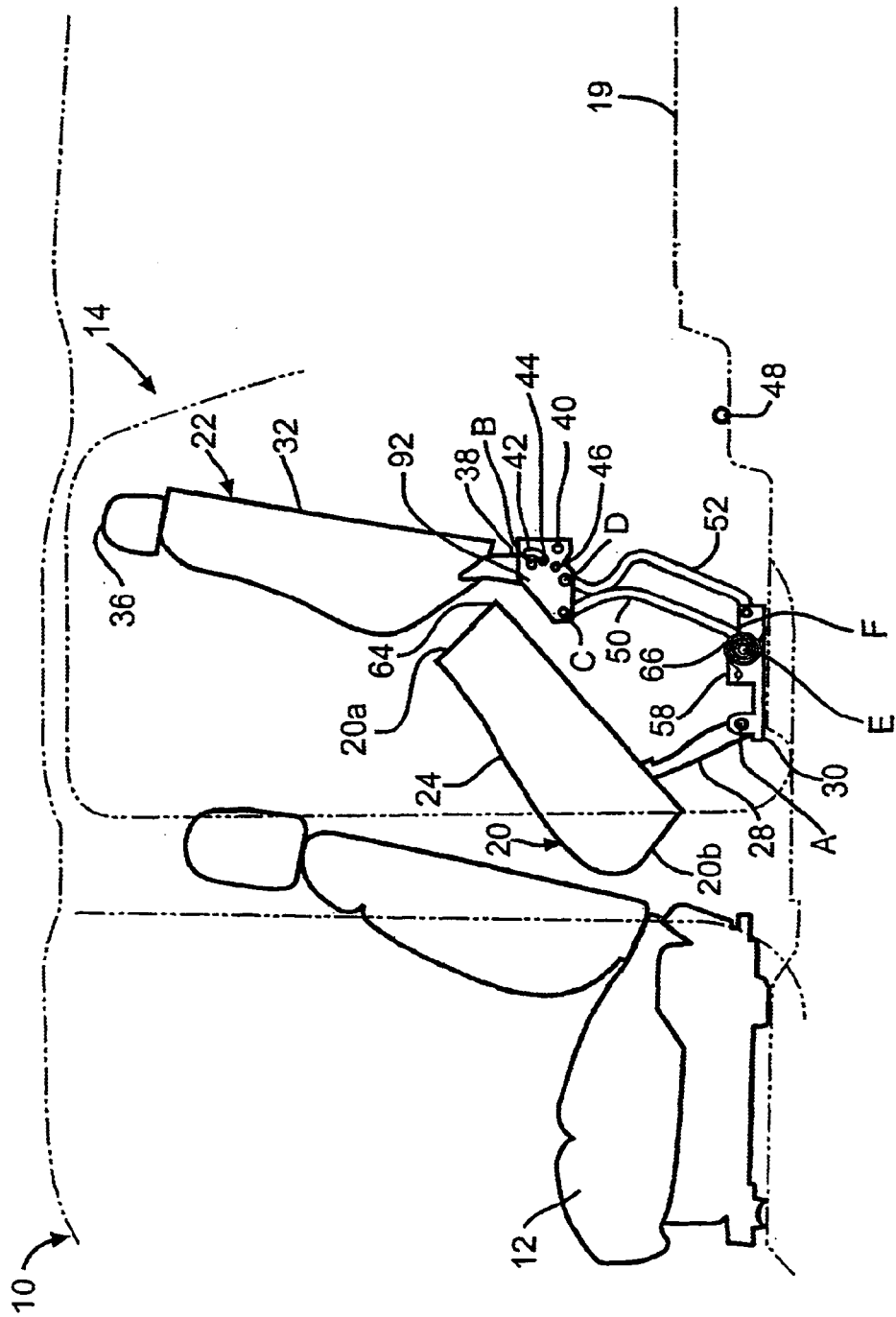
FIG. 3 is a side elevational view of the seat assembly of FIG. 1 shown in an intermediate position.

Each leg 28 is preferably pivotally mounted to a leg mounting bracket 30 about a first pivot axis A for pivotal movement of the seat bottom 20 between a seating position, as shown in FIGS. 1 and 2, an intermediate position, as shown in FIG. 3, and a forward position, as shown in FIG. 4. As shown in FIGS. 1 and 2, the seat bottom 20 is in the seating position when the seat bottom 20 is in a generally horizontal position for supporting a vehicle occupant seated thereon. In the forward position shown in FIG. 4, the seat bottom 20 is in a generally vertical position such that a rear edge 20a of the seat bottom 20 is positioned above a front edge 20b of the seat bottom. The leg mounting bracket 30 may be attached to a structural portion of the motor vehicle 10 by any suitable means, such as welding or by threaded fasteners.

The seat back 22 includes a seat back cushion, indicated by phantom lines 32, suitable attached to a seat back frame 34. The seat back 22 may also include a headrest 36 attached to an upper portion of the seat back frame 34. Extensions 38 are attached to the seat back frame 34 and extend downwardly from opposing sides of the seat back frame 34. Each extension 38 is attached to a seat bracket 40 about a second pivot axis B. Preferably, the seat bracket 40 includes a slot 42 for receiving an outwardly extending pin 44 attached to the extension 38. The movement of the pin 44 within the slot 42 may thereby limit the rotation of the seat back about pivot axis B.

As viewed in FIGS. 1 and 2, rearward ends of each of a pair of first arms 50 and a pair of second arms 52 are mounted to the seat bracket 40 about a third pivot axis C and a fourth pivot axis D, respectively. Preferably, pivot axis D is defined by a rear pivot rod 54. Forward ends of each pair of first arms 50 and second arms 52 are preferably mounted to an arm mounting bracket 58 about a fifth pivot axis E and a sixth pivot axis F, respectively. Preferably, pivot axis E is defined by a first forward pivot rod 60, and pivot axis F is defined by a second forward pivot rod 62.

The seat bracket 40 preferably includes a first seat back latch 46 for releasable engagement with a structural portion of the motor vehicle 10, such as a striker bar 48. The first seat back latch prevents or permits rotational movement of the seat back about the pivot axes C, D, E, and F.

The seat bottom frame 26 preferably includes a seat bottom latch 64 for releasable engagement with a structural portion of the seat back 22 to prevent or permit rotational movement about the pivot axis A. It should be appreciated, however, that the seat bottom latch 64 might be operative for releasable engagement with a structural portion of the vehicle 10.

Preferably, the forward ends of the first arms 50 and second arms 52 are mounted to the arm mounting brackets 58, so at to allow for pivotal movement of the seat back 22 between a first or seating position, as shown in FIGS. 1 and 2, an intermediate position, as shown in FIG. 3, and a second or easy entry position, as shown in FIG. 4. As shown in FIGS. 1 and 2, the seat back 22 is in the seating position when the seat back 22 is in a generally vertical position for supporting an occupant seated upon the seat assembly 14. In the second, or easy entry position shown in FIG. 4, the seat back 22 is positioned upwardly and forwardly relative to seating position of the seat back 22, thereby maximizing an area of ingress and egress through the second row door opening 16 for a vehicle occupant. Note that the seat back 22 is also in a vertical position when in its easy entry position.

Figure 5:
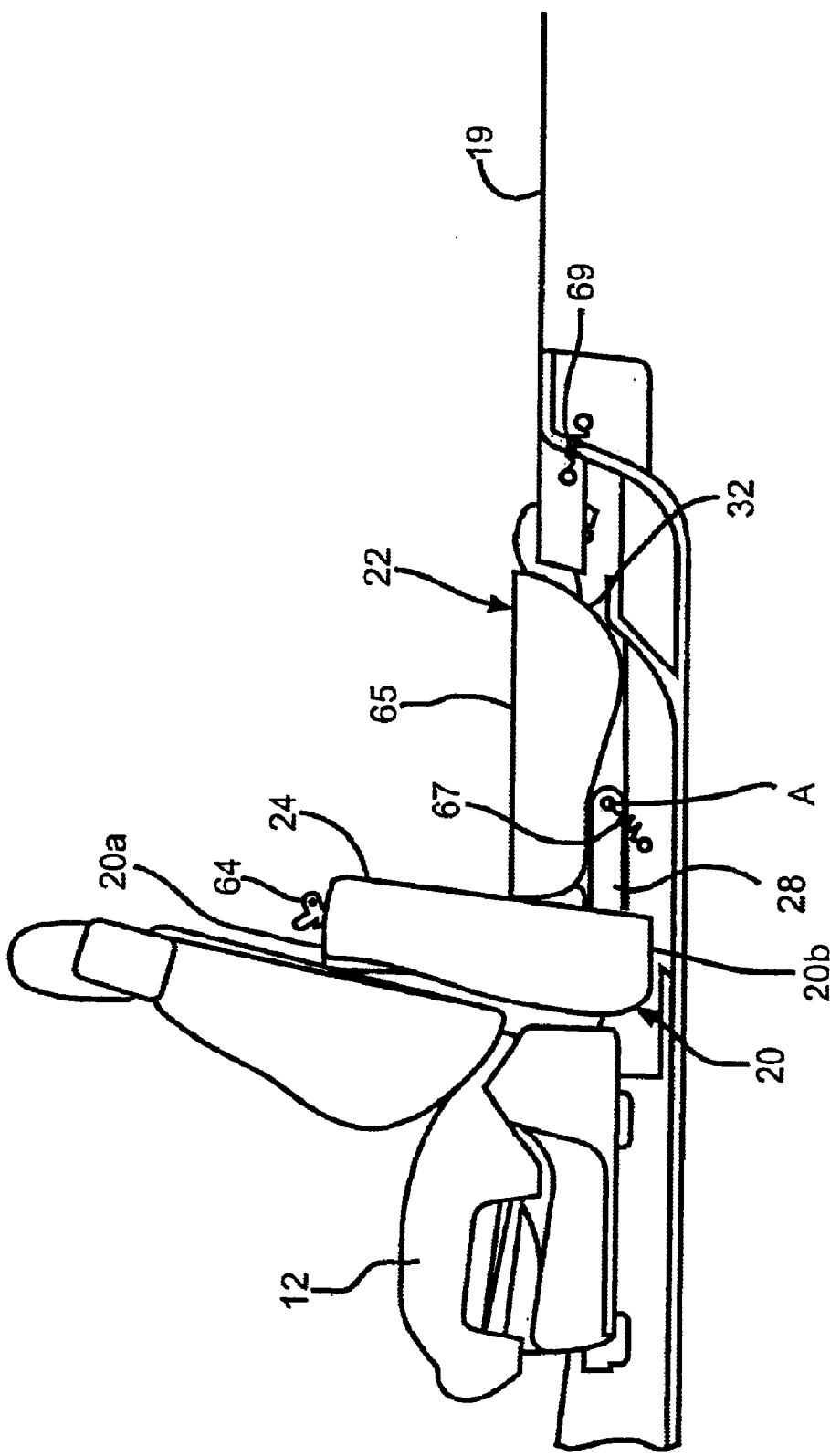
FIG. 5 is a side elevational view of the seat assembly of FIG. 1 shown in a storage position.

Alternately, as will be explained below, the seat back 22 may be pivotally moved about the pivot axis B between the seating position and a third or storage position, as shown in FIG. 5. In the third or storage position, the seat back 22 is in a generally horizontal position such that a rear side 65 of the seat back 22 faces upwardly as viewed in FIG. 5. The arm mounting bracket 58 may be attached to a structural portion of the motor vehicle 10 by any suitable means, such as welding or by threaded fasteners. Preferably, the rear side 65 of the seat back 22 and the floor 19 are coplanar so that they form a continuous flat load floor, as shown in FIG. 5.

Preferably, the seat assembly 14 includes a second seat back latch, indicated generally 92, for releasable engagement of the seat back 22 relative to the seat bracket 40 to prevent or permit rotational movement about the pivot axis B.

Preferably, a spiral extension spring 66 is attached the arm mounting bracket 58 and the first forward pivot rod 60. The spring 66 urges the first arm 50, and therefore the seat back 22, upwardly and forwardly as the seat back 22 is moved to the easy entry position. Thus, the spring 66 biases the seat back 22 to its easy entry position. Referring to FIG. 5, it should be appreciated that a second spring, indicated schematically at 67, may be attached to the seat bottom 20 to bias seat bottom 20 toward its forward position. As further shown in FIG. 5, a third spring, indicated generally at 69, may be attached to the seat back 22 to bias the seat back 22 toward the third or storage position. It should be understood that the springs 66, 67, and 69 may be any spring mechanism suitable for urging the first arm 50, the seat bottom 20, and the seat back 22, respectively, toward a desired position.

Figure 6:
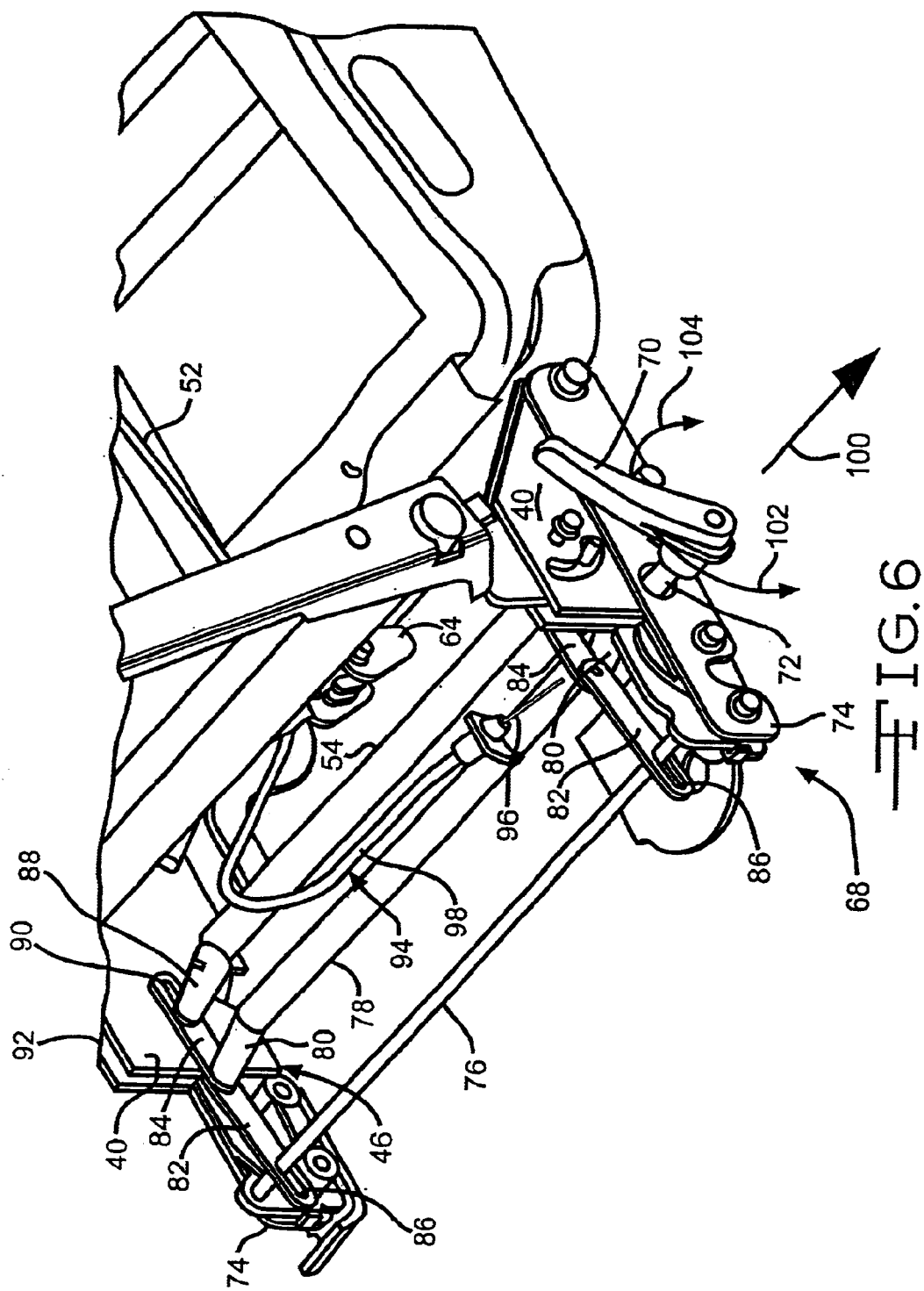
FIG. 6 is an enlarged perspective view of a latching mechanism for the seat assembly of FIG. 1.

There is illustrated in FIG. 6 a preferred embodiment of a latching mechanism, shown generally at 68, for operation of the seat assembly 14 between its various positions. As will be explained below, the latching mechanism 68 can be manually operated, via a single handle 70, to actuate the latches 46, 92, and 64 to move the seat assembly to its easy entry position, storage position, and forward position, respectively. Of course, the latching mechanism could be power operated to include any suitable number of latches for operating one or more of the latches 46, 92, and 64.

The latching mechanism 68 includes the handle 70 which is rotatably connected to a first latch release rod 72. Seat bracket extensions 74 extend rearwardly from the seat brackets 40. A second latch release rod 76 extends between the seat bracket extensions 74 and is operatively connected to the first seat back latch 46. Preferably, the first latch release rod 72 is slidably contained within a first latch release rod conduit 78. A pair of first link arms 80 extend radially from opposite ends of the first latch release rod conduit 78. Each first link arm 80 is pivotally connected to a rearwardly extending first linkage 82 and a forwardly extending second linkage 84.

The second latch release rod 76 extends through a slot 86 in each first linkage 82. One end of a second link arm 88 is pivotally mounted to each seat bracket 40. The other end of each second link arm 88 is slidingly received in a slot 90 of each second linkage 84. The second link arm 88 is also operatively connected to the second seat back latch 92. Preferably, the second seat back latch 92 is operative for releasable engagement with a portion of the seat back, such as the seat bracket 40. A cable assembly 94 includes a cable 96 and a cable conduit 98 and connects the first latch release rod 72 to the seat bottom latch 64.

Preferably, the latching mechanism 68 will be operated when the seat assembly 14 is in the seating position as shown in FIGS. 1 and 2. In operation, actuation of the handle 70 operates to unlatch the seat bottom 20 and the seat back 22. As shown in FIG. 6, the handle 70 may be pulled outwardly, as indicated by the arrow 100. Outward movement of the handle 70 moves the cable 96 which, in turn, causes the seat bottom latch 64 to move to an open position, thereby unlatching the seat bottom 20 from the seat back 22. The seat bottom 20 may then be moved from its seating position to its forward position as shown in FIGS. 3 through 5. Once the seat bottom is in the forward position, the handle 70 may then be actuated to unlatch the seat back 22, into either the easy entry position or storage position, as described below.

The handle 70 may be rotated counter clockwise, as indicated by an arrow 102 in FIG. 6. Counter clockwise rotation of the handle 70, operates to rotate first link arms 80, which moves the first linkage 82 rearwardly. Rearward movement of the first linkage operates to move the second latch release rod 76 which, in turn, causes the first seat back latch 46 to move to an open position, thereby unlatching the seat back 22 from the structural portion of the motor vehicle 10. Once unlatched from the vehicle 10, the seat back may be moved to the easy entry position as shown in FIG. 4.

For the embodiment of the seat assembly 14 shown in FIGS. 2 through 4, its is preferred that the seat bottom 20 be first moved to its forward position prior to moving the seat back to its easy entry position. However, for the embodiment of the seat assembly 14' shown in FIGS. 7 through 9 in which the seat bottom is connected to the seat back by the linkage 106 as described in detail below, initial movement of the seat bottom is not necessary.

Similarly, clockwise rotation, as indicated by the arrow 104, of the handle 70, operates to rotate the first link arms 80 in a clockwise direction, which moves the second linkage 84 forwardly. Forward movement of the second linkage 84 operates to move the second link arms 88 which, in turn causes the second seat back latch 92 to move to an open position, thereby unlatching the extension 38 from the seat bracket 40. Once unlatched from the seat bracket 40, the extension 38, and thereby the seat back 22, may be rotated forwardly to the storage position as shown in FIG. 5.

It should be understood that any suitable latching system may be used to move the seat between its various positions other than what is described with respect to the latching mechanism 68. For example, the latching mechanism 68 could be configured such that clockwise rotation of the handle 70 operates to move the seat back 22 to its storage position, but with initial clockwise movement releasing latch 64 to automatically cause the seat bottom 20 to move to its forward position, such as by a secondary cable assembly. Thus, the handle 70 need not be first pulled to advance to the seat bottom 20 from its seating position to its forward position.

Figure 7:
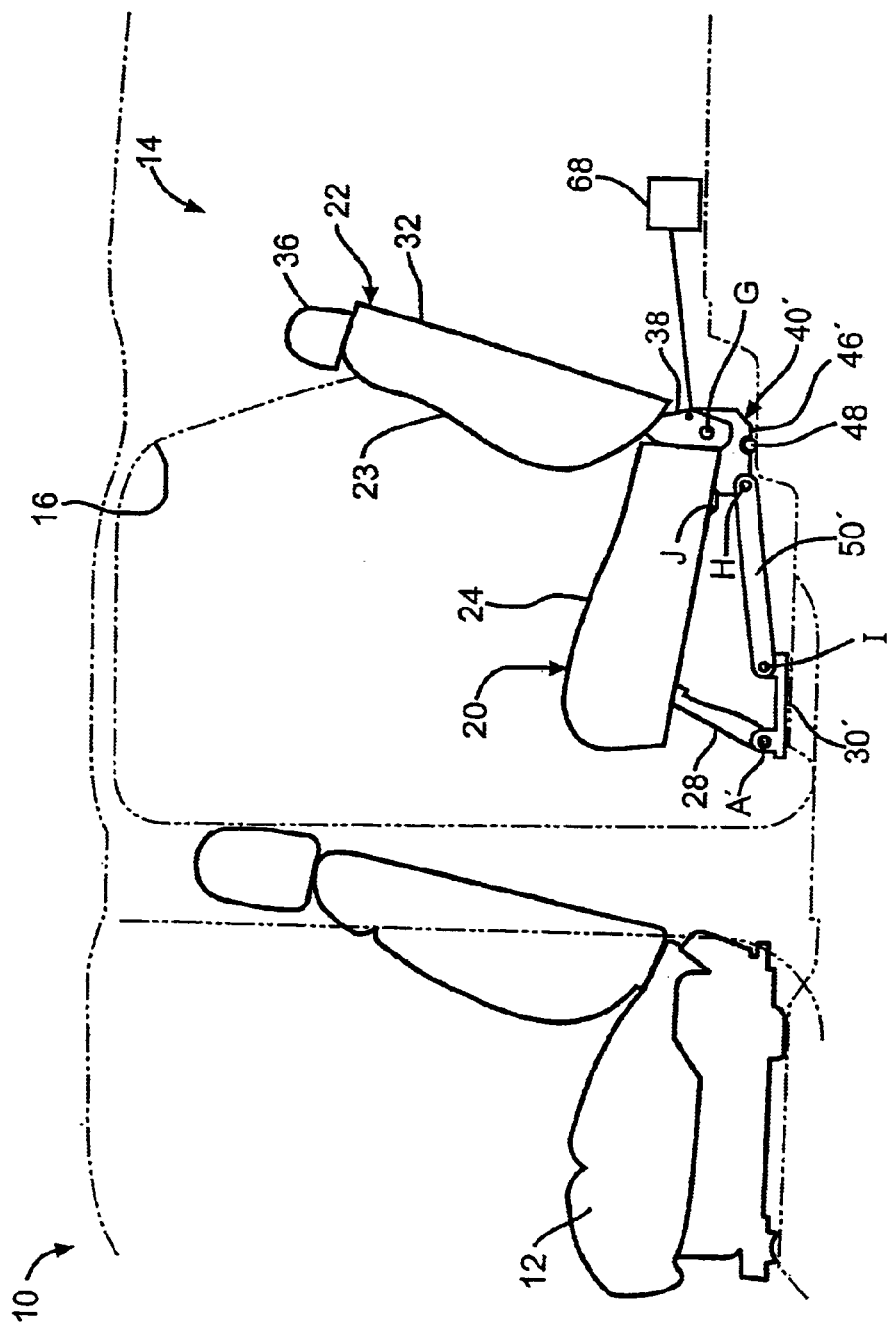
FIG. 7 is a side elevational view of a second embodiment of a seat assembly of the invention installed in a motor vehicle.
Figure 8:
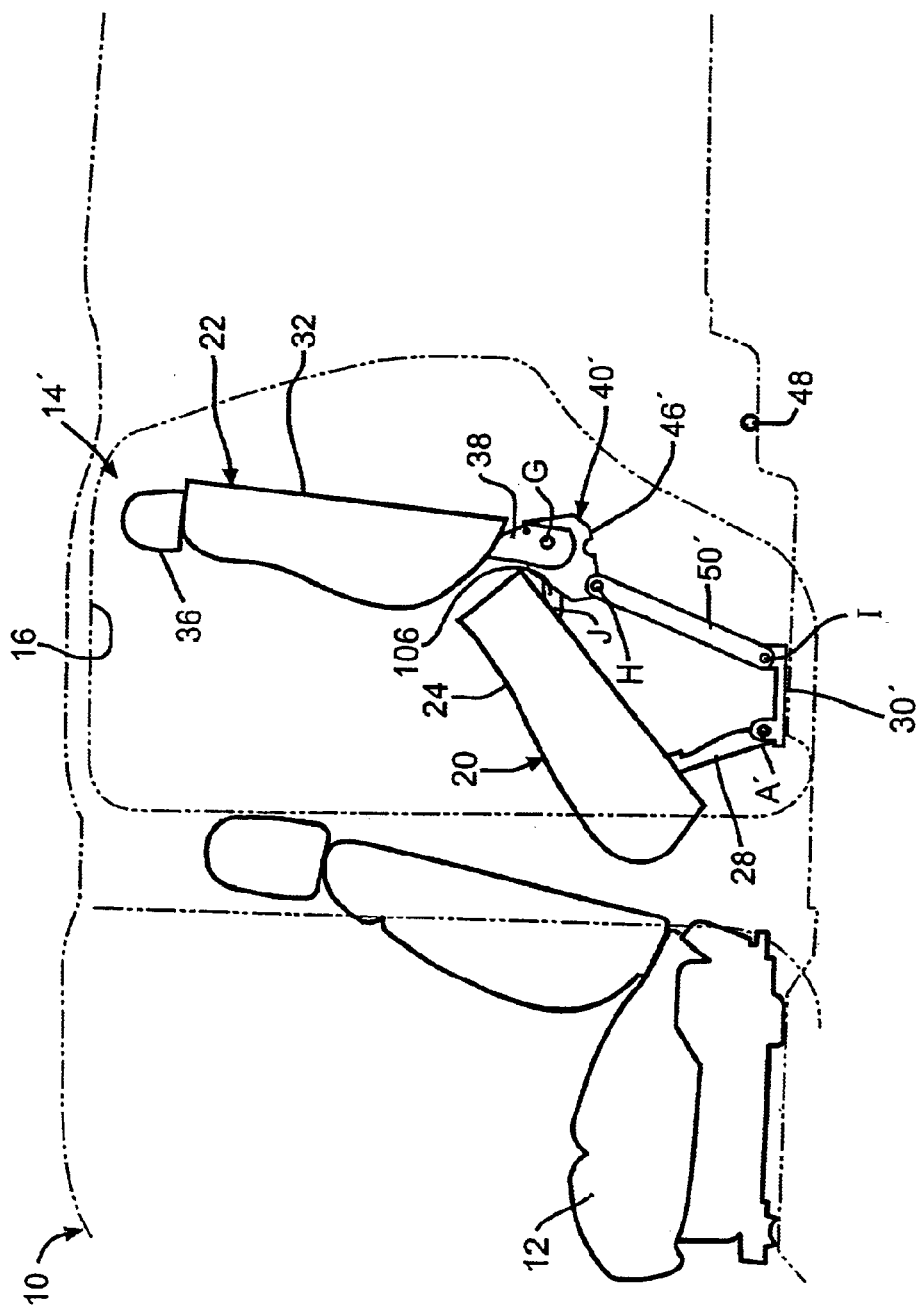
FIG. 8 is a side elevational view of the seat assembly of FIG. 7 shown in an intermediate position.

FIGS. 7 through 9 illustrate an alternate embodiment of the seat assembly, indicated generally at 14'. The seat assembly 14' is similar to the seat assembly 14, and like numbers will be used for similar structures. The seat assembly 14' includes a seat bottom 20 and a seat back 22. The seat bottom 20 includes seat bottom cushion 24 suitably attached to the seat bottom frame (not shown). Legs 28 extend downwardly from the seat bottom frame and are mounted to a leg mounting bracket 30' about a first pivot axis A' for pivotal movement of the seat bottom 20 between a seating position, as shown in FIG. 7, an intermediate position, as shown in FIG. 8, and an easy entry position, as shown in FIG. 9. The leg mounting bracket 30' may be attached to a structural portion of the motor vehicle 10 by any suitable means, such as welding or by threaded fasteners.

The seat back 22 includes seat back cushion 32 suitable attached to the seat back frame (not shown), and may also include headrest 36 attached to an upper portion thereof. Extensions 38 are attached to the seat back frame and extend downwardly from opposing sides of the seat back frame. Each extension 38 is attached to a seat bracket 40' about a seventh pivot axis G. The seat bracket 40 may include a first seat back latch 46' for releasable engagement with a structural portion of the motor vehicle 10, such as striker bar 48.

As viewed in FIG. 7, rearward ends of a pair of arms 50' are mounted to the seat bracket 40' about an eighth pivot axis H. Forward ends of the pair of arms 50' are preferably mounted to the leg mounting bracket 30' about a ninth pivot axis I. One end of a third linkage 106 is pivotally mounted to the seat bracket 40' about pivot axis G. The other end of the third linkage 106 is pivotally mounted to the seat bottom frame 26 about a tenth pivot axis J. The third linkage 106 thereby connects the seat bottom 20 to the seat back 22 in a moveably dependent relationship. The term moveably dependent as used herein is defined to mean that upward and forward movement of the seat back 22 will cause a similar upward and forward movement of the seat bottom 20. Likewise, upward and forward movement of the seat bottom 20 will cause a similar upward and forward movement of the seat back 22. It will be appreciated that the seat assembly 14' may also include the spiral extension spring 66, as shown in FIGS. 1 through 4, for urging the seat back upwardly and forwardly as the seat back is moved to the easy entry position.

The seat assembly 14' may include a latching mechanism 68', schematically illustrated in FIG. 7. The latching assembly 68' may be any latching assembly suitable for moving first seat back latch 46' to an open position, such as the latching assembly 68. In operation, actuation of the latching assembly 68' operates to move the first seat back latch 46' to an open position, thereby unlatching the seat assembly 14' from the structural portion of the motor vehicle. Once the first seat back latch 46' is moved to the open position, the seat assembly 14' may be pivoted upwardly and forwardly between the seating position, as shown in FIG. 7, an intermediate position, as shown in FIG. 8, and the easy entry position, as shown in FIG. 9. To place the seat assembly 14' to its seating position from its easy entry position, either the seat bottom or seat back 22 can be manually pushed back against the force of the spring mechanisms.

The seat assembly 14' operates similarly to the seat assembly 14, with one of the to exceptions being that the seat bottom 20 and the seat back 22 of the seat assembly 14' move dependently on each other due to the connection of the linkage 106 therebetween. Because of this connection, one of the arms 50 and 52 may be removed from the embodiment of the seat assembly 14 to maintain the seat back in a generally vertical position when moved between its seating and easy entry position.

Although the seat assemblies 14 and 14' have been shown and described as being used to allow access to a third row seat or a rear cargo area, it should be understood that the seat assembly can be used in a vehicle to simply move the seat assembly forward to increase the cargo area of the vehicle.

The principle and mode of operation of this invention have been described in its preferred embodiments. However, it should be noted that this invention may be practiced otherwise than as specifically illustrated and described without departing from its scope.

What is claimed is:

1. A seat assembly comprising:

a seat bottom movable between a seating position, wherein said seat bottom is in a generally horizontal position for supporting an occupant seated on said seat assembly, and a forward position, wherein said seat bottom is in a generally vertical position such that a rear edge of said seat bottom is positioned above a front edge of said seat bottom; and a seat back movable between a seating position, wherein said seat back is in a generally vertical position for supporting an occupant seated on said seat assembly, and a second position, wherein said seat back is positioned upwardly and forwardly relative to said seating position of said seat back, wherein said seat bottom is movable between said seating position and said forward position independent of movement of said seat back.

2. The seat assembly of claim 1, wherein said seat back remains in a generally vertical position when moved between said seating and said second positions.

3. The seat assembly of claim 1, wherein said seat back is positioned above said seat bottom when said seat bottom is in said forward position and said seat back is in said second position.

4. The seat assembly of claim 1 further including a front seat positioned in front of said seat assembly, and wherein said seat bottom is adjacent said front seat when said seat bottom is in said forward position.

5. The seat assembly of claim 4, wherein said seat bottom is between said front seat and said seat back when said seat bottom is in said forward position and said seat back is in said second position.

6. The seat assembly of claim 1, wherein said seat back is movable to a third position, wherein said seat back is in a generally horizontal position such that a rear side of said seat back faces upward.

7. The seat assembly of claim 6 further including a latching mechanism, said latching mechanism selectively latching and unlatching one of the seat bottom and the seat back.

8. The seat assembly of claim 7 wherein said seat back further includes a first seat back latch for releasable engagement with said portion of the vehicle, said seat back including a second seat back latch for releasable engagement with a bracket such that, said seat back is moveable between the seating position and third position, and said seat bottom including a seat bottom latch for releasable engagement with one of said portion of the vehicle and a portion of said seat back.

9. The seat assembly of claim 8 further including a spring mechanism biasing said seat back to said second position.

10. The seat assembly of claim 8 further including a spring mechanism biasing said seat bottom to said forward position.

11. The seat assembly of claim 8 further including a spring mechanism biasing said seat back to said third position.

12. The seat assembly of claim 8 further including a handle mounted to one of said seat assembly and said portion of the vehicle, said handle being operative to actuate said seat bottom latch when pulled outwardly from said one of said seat assembly and said portion of the vehicle, said handle being operative to actuate said first seat back latch when rotated in a first direction, and said handle being operative to actuate said second seat back latch when rotated in a second direction.

13. The seat assembly of claim 1 further including:

a bracket pivotally connected to a lower portion of said seat back;

an arm having a first end pivotally connected to said bracket at a first pivot, and a second end adapted to be pivotally connected at a second pivot to a portion of a vehicle in which said seat assembly is installed.

14. The seat assembly of claim 13 further including a second arm having a first end pivotally connected to said bracket at a third pivot spaced from said first pivot, and a second end adapted to be pivotally connected at a fourth pivot to said portion of a vehicle, wherein said fourth pivot is spaced from said second pivot.

15. The seat assembly of claim 13 further including a link having a first end connected to said seat bottom and a second end connected to said bracket such that said seat bottom and said seat back are movably dependent on each other.

* * * * *